United States Patent [19]
Perna

[11] 3,791,014
[45] Feb. 12, 1974

[54] HAND CUTTING TOOL FOR GYPSUM PLASTER BOARDS OR THE LIKE

[76] Inventor: Anthony Perna, 118-01 101st Ave., Richmond Hill, N.Y. 11419

[22] Filed: May 22, 1972

[21] Appl. No.: 255,813

[52] U.S. Cl. .................................... 30/294, 83/5
[51] Int. Cl. ........................................ B26b 27/00
[58] Field of Search ..... 30/280, 290, 294, 289, 169, 30/166; 83/5

[56] References Cited
UNITED STATES PATENTS
2,442,694   6/1948   Keiser .................................. 30/289

Primary Examiner—Othell M. Simpson
Assistant Examiner—Harold P. Smith, Jr.
Attorney, Agent, or Firm—Alexander Mencher

[57] ABSTRACT

A hand cutting tool for recessing edges of gypsum plaster or wall boards and the like to facilitate attaching and minimizing beading and ridging at the butt joints therebetween when applied to a wall comprising an elongated body having an engaging groove for insertion of the edge of a board, a saw blade projecting from the base of the groove and running parallel with and spaced from one of the inner walls of the groove whereby a cut directly beneath the paper covering of the board may be made of preselected thickness and depth. The cutting tool effectively is a rabbet saw especially designed for rabbeting edges of plaster, gypsum or similar type boards.

3 Claims, 8 Drawing Figures

Patented Feb. 12, 1974

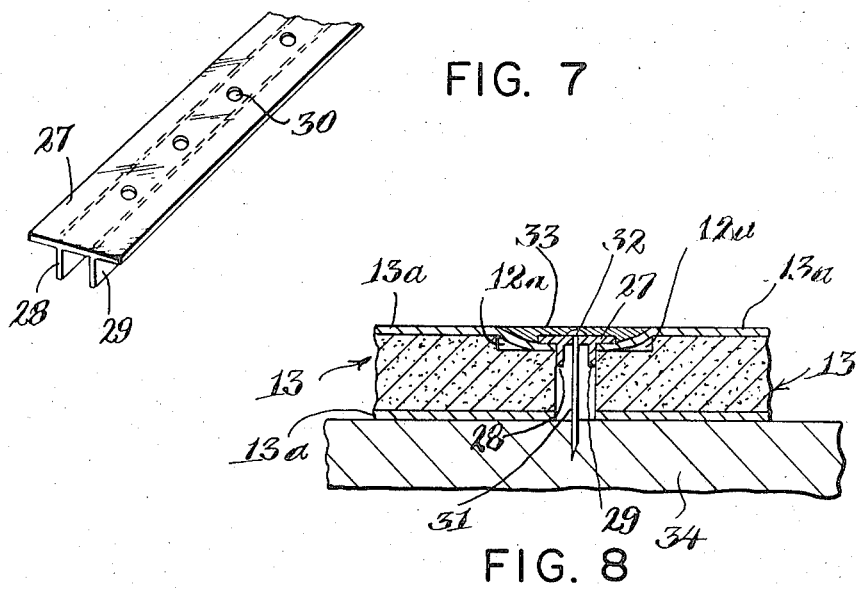

HAND CUTTING TOOL FOR GYPSUM PLASTER BOARDS OR THE LIKE

BACKGROUND OF INVENTION

The present invention relates to a hand cutting tool or rabbet saw designed specifically to make cuts on the edges of wallboards of gypsum, plaster or other materials beneath the paper covering to permit introduction of a securing joint and spacer between adjacent or adjoining boards when laid on and adapted to be affixed to a wall or stud. The tool has application to a novel type of joint and spacer stripping which forms the subject matter of a United States application filed contemporaneously herewith. From applicant's present knowledge and experience no type of rabbet saw is known which has been adapted and designed for undercutting the raw edges of wallboards directly beneath the covering for preparing the butt joints between adjacent and adjoining wallboards for finishing without the concomitant beading and ridging attendant therewith.

SUMMARY OF THE INVENTION

It is a primary object of the invention to provide a hand cutting tool or a rabbet saw adapted to recess edges in wallboards directly beneath the paper covering for facilitating the finishing of butt joints therebetween without attendant beading and ridging, said tool being light in weight, adjustable, efficient and easy of operation, simple in construction, sturdy, economical in cost and having removable parts.

Other objects and advantages will hereinafter appear in the progress of the disclosure and as pointed out in the appended claims.

BRIEF DESCRIPTION OF DRAWINGS

For a fuller understanding of the invention, reference is had to the following description taken in conjunction with the accompanying drawings, in which:

FIG. 7 is a fragmentary view in elevation of the joint used for spacing and joining the cut edges of adjacent or adjoining panels to a wall or stud.

FIG. 8 is a fragmentary sectional view of adjacent or adjoining panels secured to a wall or stud by means of the said joint and showing the valley above the joint filled in as by cement to form a coplanar and continuous surface.

DESCRIPTION OF PREFERRED EMBODIMENT

Figure 1:
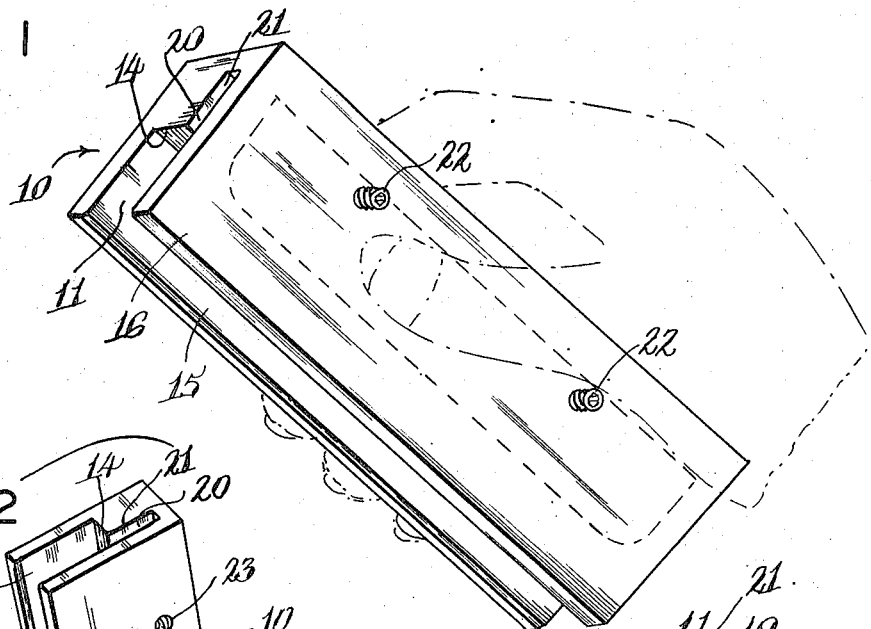
FIG. 1 is a view in perspective showing the tool ready to be applied to any edge of a wall board for rabbeting the same directly beneath the covering thereof.
Figure 2:
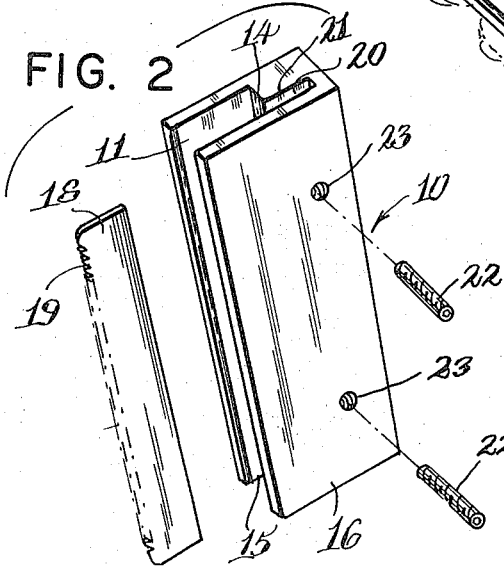
FIG. 2 is a reduced exploded view in perspective showing the saw blade removed from the body of the tool.
Figure 3:
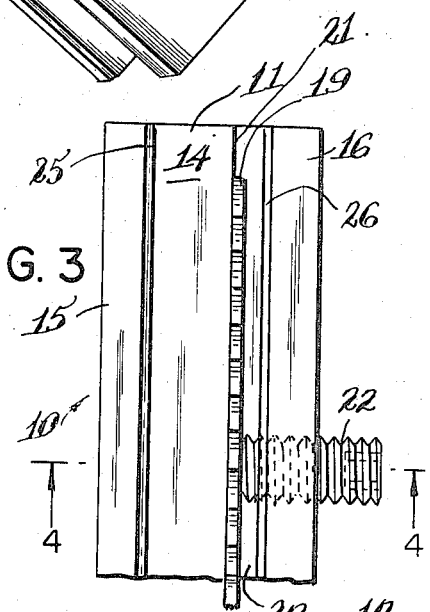
FIG. 3 is an underside fragmentary view in elevation showing the groove or mouth of the tool introduceable into the edge of a wallboard panel.
Figure 6:
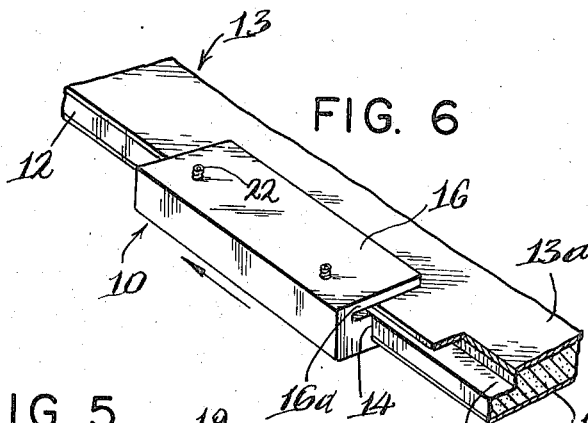
FIG. 6 is a view in perspective showing application and movement of the tool with respect to the raw edge of a wallboard.
Figure 5:
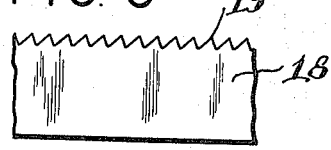
FIG. 5 is a sectional view of the saw blade taken across the plane 5—5 of FIG. 4.
Figure 4:
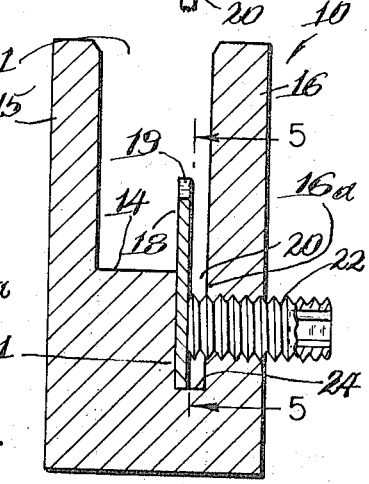
FIG. 4 is a sectional view of FIG. 3 across the plane 4—4 thereof.

In accordance with the invention and the preferred form shown the body of the tool generally designated by numeral 10 is preferably in the form of an elongated aluminium casting having a mouth or groove 11 to engage a raw edge 12 of wallboard panel 13 as best seen in FIG. 6. Groove 11 is rectangular in cross-section and is formed between a bottom wall 14 and side walls 15 and 16. Disposed within groove 11 is a saw blade preferably of steel or an alloy thereof designated by numeral 18 and having an operative toothed edge 19. Means are provided for mounting of blade 18 within groove 11 whereby depth of cut 12a in wallboard panel 13 along edge 12 is limited by bottom wall 14 of the groove and width and location of the cut is limited by the thickness of blade 18 and its positioning directly beneath wallboard covering 13a as best seen in FIGS. 4 and 6.

As shown, mounting of blade 18 is suitably accomplished as by being removably affixed in a longitudinal slot 20 extending along groove bottom wall 14, one of the walls 16a of said slot being continuous and coplanar with the inner face of groove wall 16. Slot 20 is also bounded by a base wall 21 against which blade 18 is secured as by threaded fastening elements such as set screws 22 engaging threaded openings 23 in the slotted area of groove wall 16 and by a rear wall 24 against which the back edge of blade 18 abuts as best seen in FIG. 4. Blade 18 is spaced from slot wall 16a to acommodate saw teeth 19 for undercutting wallboard 13 directly beneath wallboard covering 13a. The width of the cut is suitably determined by the thickness of the blade 18 and the depth of cut is suitably determined by the extent of projection of blade teeth 19 from groove bottom wall 14. The width of the mouth of groove 11 is of any selected size to slidably receive and engage the edge portion of wallboard 13 during undercutting operation in a fashion similar to the use of a rabbet plane for making cuts along edges of materials.

It is to be noted that entry edges of the groove walls 15 and 16 are rounded or bevelled as at 25 and 26 as well as end edges of groove base wall (not shown) so that wallboard edges when first introduced into groove 11 will not be lacerated and so that wallboard coverings 13a will not be lacerated when the tool operating as a rabbet saw is passed back and forth for effecting the cut 12a as seen in FIG. 6

The tool is adapted to be of a size to suit the thickness of wallboard 13. In the embodiment shown, the tool is suitably dimensioned for a ⅝ inch wallboard and dimensions for such work piece is to be set forth although dimensions of the tool for a ½ inch and ⅝ inch wallboard would be proportionately altered. Thus, tool body 10 as shown is about four inches in length and ¾ inches in width, groove 10 being about 13/32 in width to slidably receive ⅝ inch wallboard. Knife blade 18 as shown is of a size and so located as to effectuate a cut directly beneath wallboard covering 13a which is about 1/16 inch wide by about ⅝ inch in depth as indicated by numeral 12a in FIG.6. For making such a dimensioned cut, the blade should be approximately 1/16 inches in thickness and should project from groove bottom wall or fence 18 to make such a depth of cut. Moreover, blade 18 is spaced from walls 16–16a to accommodate for the thickness of wallboard covering 13a, such spacing depending on the thickness of blade 18 and the width of slot 20. Blade 18 as shown is 1/16 by one inch in thickness and width dimensions and is adapted to fit into slot 20 of a width and depth of ⅛ and ⅝ inches.

The dimensions given of the tool and parts for a ⅜ inch wallboard are to create a cut 12a of the dimensions hereinabove stated, but other tool and part dimensions to effect cut-outs of different size from 12a may be resorted to to suit the requirements.

Cut-outs 12a as has been mentioned are adapted to give a depressed area between adjacent or adjoining panels 13 as seen in FIG. 7 to apply joining and finishing means to minimize beading and ridging at the butt joints. As shown, the joining means forming the subject matter of a contemporaneously filed U.S. patent application heretofore stated consists of an elongated joining and securing strip preferably formed of metal and comprising a flat backing 27 and intermediate depending and spaced legs 28 and 29, said backing 27 having nail openings 30 along the axis to receive securing nails 31 for affixation to the wall or stud 34. The dimensions of the securing strip may vary depending upon the size of the cut-outs 12a, but for the dimensions described and to give a valley of about one inch in width and of a depth to be below coplanar surfaces of wallboard panels 13 as seen in FIG. 7 to accommodate the affixation of the securing strip, said strip is about ½ inch wide and 0.012 inches in thickness with respect to the backing portion 27, and the legs 28 and 29 measure about ¼ inch in depth and separation.

As seen in FIG. 8, legs 28 and 29 serve as spacing for adjacent or adjoining panels 13, backing 27 pulls down and clamps the overhanging portions of coverings 13a against the coplanar walls of cutouts 12a, nails 31 secure the wallboards in place and cement 33 overlying nail heads 32, overhanging covering portions of 13a and backing 27 affords the means to smooth out the butt joint formed to eliminate formation of beading and ridging incidental to conventional butt joint finishing.

It is understood that the tool described for making cut-outs in the edges of wallboards may be of variable and desired dimensions to suit requirements and that the parts thereof in size, material and integration may be varied as for adjustability without departing from the spirit of the invention and the scope of the appended claims.

I claim:

1. A manually operated tool for recessing raw edges of wallboard panels below the covering lamination comprising a tool body block to serve partly as a handle and having along one longitudinal edge spaced and integral parallel legs to form the side and bottom walls of a longitudinal groove rectangular in cross-section along the length thereof and operating to serve as the mouth for receiving and engaging slidably along the length of the groove the edge of a wallboard panel to a preselected depth, a saw blade parallel with said legs, and means to mount said blade in the tool body block intermediate the side walls with the operative blade edge projecting into the groove and running parallel with the leg edges, for purposes of rabbeting the edge of the wallboard panel directly below the covering lamination by to and fro movement of the block against and along said edge of the wallboard panel.

2. A manually operated tool as set forth in claim 1 wherein said means to mount the blade comprises securing elements penetrating part of the tool body block and retaining walls for the blade formed by an elongated slot extending from the bottom wall of the longitudinal groove, said securing elements entering said slot and engaging and securing the blade therein.

3. A manually operated tool as set forth in claim 2 wherein said tool is formed of a metal casting and said securing means are comprised of a plurality of set screws.

* * * * *